US012742052B2

(12) United States Patent
King

(10) Patent No.: US 12,742,052 B2
(45) Date of Patent: Sep. 22, 2026

(54) SYSTEM AND PROCESS FOR CONVERTING WASTE PLASTIC INTO A USABLE PRODUCT

(71) Applicant: James L. King, Bella Vista, AR (US)

(72) Inventor: James L. King, Bella Vista, AR (US)

( * ) Notice: Subject to any disclaimer, the term of this patent is extended or adjusted under 35 U.S.C. 154(b) by 35 days.

(21) Appl. No.: 18/357,641

(22) Filed: Jul. 24, 2023

(65) Prior Publication Data

US 2024/0018328 A1 Jan. 18, 2024

(51) Int. Cl.

| | |
|---|---|
| ***C08J 11/06*** | (2006.01) |
| ***B29B 17/00*** | (2006.01) |
| ***B29B 17/04*** | (2006.01) |
| ***B65D 19/38*** | (2006.01) |
| ***C08J 7/04*** | (2020.01) |
| ***E04C 1/40*** | (2006.01) |
| ***E04C 2/20*** | (2006.01) |
| ***E04H 15/56*** | (2006.01) |
| *B29B 9/06* | (2006.01) |
| *B29B 17/02* | (2006.01) |
| *B29K 25/00* | (2006.01) |
| *B29K 105/26* | (2006.01) |

(52) U.S. Cl.

CPC ........... *C08J 11/06* (2013.01); *B29B 17/0026* (2013.01); *B29B 17/0412* (2013.01); *B65D 19/38* (2013.01); *C08J 7/04* (2013.01); *E04C 1/40* (2013.01); *E04C 2/20* (2013.01); *E04H 15/56* (2013.01); *B29B 9/06* (2013.01); *B29B 17/02* (2013.01); *B29B 2017/0203* (2013.01); *B29K 2025/06* (2013.01); *B29K 2105/26* (2013.01); *B65D 2519/00009* (2013.01); *C08J 2325/06* (2013.01)

(58) Field of Classification Search

CPC . B29B 17/0026; B29B 17/0042; B29B 17/02; B29B 17/0412; B29B 2017/0203; B29B 2017/042; B29B 9/06; B29K 2025/06; B29K 2105/26; B65D 19/38; B65D 2519/00009; C08J 11/06; C08J 2300/30; C08J 2325/06; C08J 2367/02; C08J 2400/00; C08J 7/04; C08J 7/0427; E04C 1/40; E04C 2/20; E04H 15/56; Y02W 30/62

See application file for complete search history.

(56) References Cited

U.S. PATENT DOCUMENTS

| | | | |
|---|---|---|---|
| 6,797,216 | B2 | 9/2004 | Furgiuele |
| 2014/0228518 | A1 | 8/2014 | Alsewailem |
| 2021/0131041 | A1 | 5/2021 | Penland, Jr. |

FOREIGN PATENT DOCUMENTS

| | | | |
|---|---|---|---|
| DE | 102006054770 | B4 | 5/2008 |
| ES | 2775611 | T3 | 7/2020 |

OTHER PUBLICATIONS

RU 205436 U1 Jul. 14, (Year: 2021).*

* cited by examiner

*Primary Examiner* — Lawrence D Ferguson

(57) ABSTRACT

A system, process and resulting product which converts currently non-recycled plastics plastic bottles, jars, containers, PVC tubing, toys, furniture, synthetic plastic carpet and all other plastics that can be shredded, chipped, powered and or melted into a building material or useful utilitarian object such as a loading pallet.

3 Claims, 10 Drawing Sheets

1200

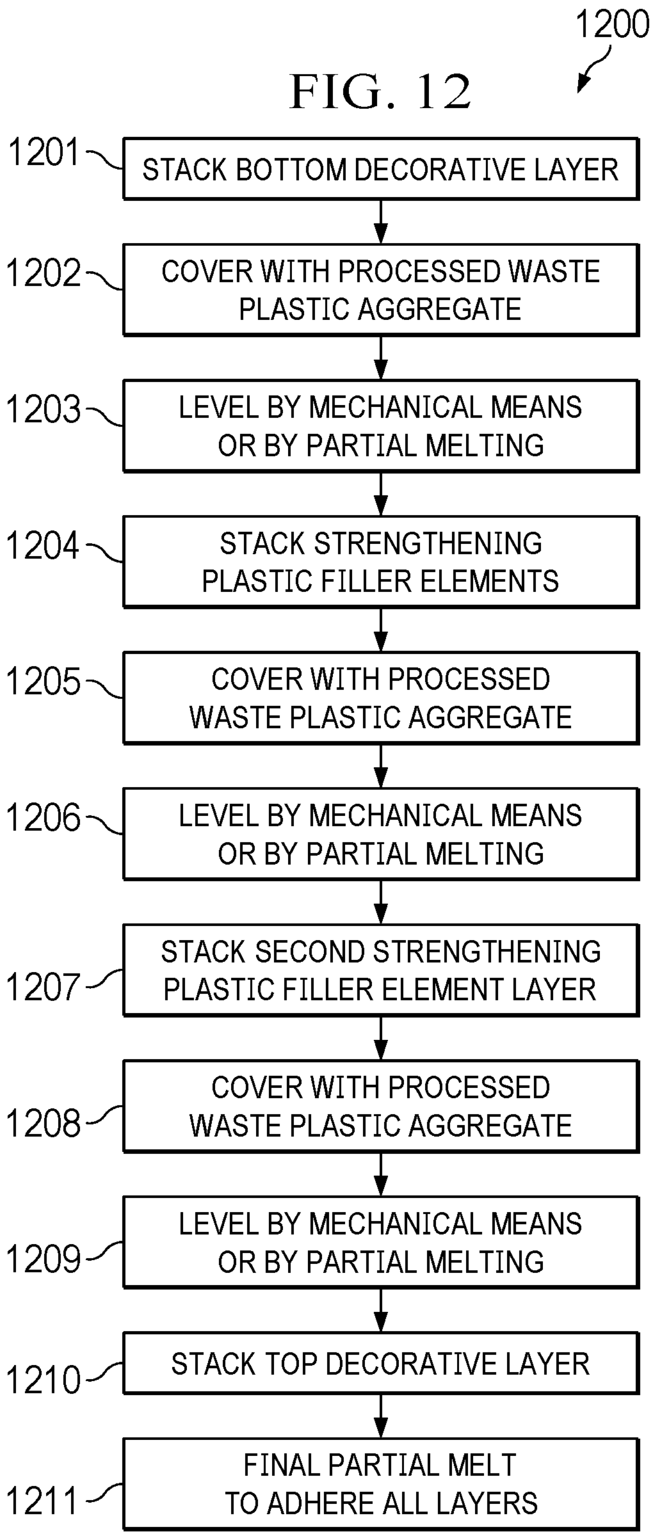

FIG. 12
1201
STACK BOTTOM DECORATIVE LAYER
1202
COVER WITH PROCESSED WASTE PLASTIC AGGREGATE
1203
LEVEL BY MECHANICAL MEANS OR BY PARTIAL MELTING
1204
STACK STRENGTHENING PLASTIC FILLER ELEMENTS
1205
COVER WITH PROCESSED WASTE PLASTIC AGGREGATE
1206
LEVEL BY MECHANICAL MEANS OR BY PARTIAL MELTING
1207
STACK SECOND STRENGTHENING PLASTIC FILLER ELEMENT LAYER
1208
COVER WITH PROCESSED WASTE PLASTIC AGGREGATE
1209
LEVEL BY MECHANICAL MEANS OR BY PARTIAL MELTING
1210
STACK TOP DECORATIVE LAYER
1211
FINAL PARTIAL MELT TO ADHERE ALL LAYERS

SYSTEM AND PROCESS FOR CONVERTING WASTE PLASTIC INTO A USABLE PRODUCT

CROSS REFERENCE TO RELATED APPLICATION

This application claims the benefit of U.S. Provisional Application No. 63/289,193, filed Dec. 14, 2021; in addition, this application claims the benefit and is a continuation-in-part of the prior U.S. Nonprovisional application Ser. No. 18/061,504 filed Dec. 5, 2022.

TECHNICAL FIELD

The present invention relates to the processing and recycling of waste plastic.

BACKGROUND OF THE INVENTION

Plastic is a material that has become ubiquitous in modern life. There are several types of plastic, but they are generally synthetic materials which comprise organic polymers and are derived from fossil-fuels such as petroleum. Plastics have many desirable qualities; they are lightweight, durable, easily shaped, pressed, extruded or molded, and inexpensive to produce. Different types of plastic produced by different methods can vary widely in rigidity or flexibility, opacity, color, density, strength, and response to temperature, among other properties. This versatility of plastics has led to their widespread use. Unfortunately, plastics can take up to 500 years to degrade naturally, and the wide variety of different plastics makes recycling or reusing uneconomical at scale, requiring massive sorting efforts and specialized processing plants. Some plastics are additionally used as packaging and containers for food or other substances which leave undesirable residue that must be removed before recycling. These complications mean it is generally cheaper to produce new plastics, leaving the vast majority of waste plastic to end up in landfills or incinerated. In recent years approximately 90% of waste plastic went unrecycled.

In an attempt to improve recycling rates, a categorization system was developed in the US in 1988 and eventually adopted internationally. There are seven resin identification codes (RICs) 1-7 corresponding respectively to polyethylene terephthalate (PET), high-density polyethylene (HDPE), polyvinyl chloride (PVC), low-density polyethylene (LDPE), polypropylene (PP), polystyrene (PS), and a catch-all RIC for all other types. Briefly:

RIC 1 refers to PET or PETE (Polyethylene Terephthalate); items made from PET include recycled bottles for soda, water & other drinks, cooking oil, peanut butter jars & other popular food items. PET has a glass transition temperature of approximately 80C and a high melting point of 250C.

RIC 2 refers to HDPE (High Density Polyethylene); items made from HDPE include recycled bottles such as milk jugs, shampoo bottles, cleaning products containers & detergent bottles. Traditional plastic bags like grocery bags are made of polyethylene. It has a low melting point of around 130C.

RIC 3 refers to PVC (Polyvinyl Chloride) which is used in a huge array of household items such as plumbing tubing, kids toys, plastic trays & lawn furniture. The melting point of PVC can range from 100C to 260C depending on which specific additives are used in the manufacturing process.

RIC 4 refers to LDPE which is commonly used for bags (grocery, dry cleaning, bread, frozen food bags, newspapers, garbage), plastic wraps; coatings for paper milk cartons, hot & cold beverage cups; some squeezable bottles (honey, mustard), food storage containers, container lids. It has a low melting point of 110C.

RIC 5 refers to PP (Polypropylene) which is used to make containers for yogurt, sources. margarine & straws. It has a melting point varying from 130C to 170C.

RIC 6 refers to PS (Polystyrene) which is used for coffee cups, packing peanuts, coolers. To Go Food containers. It has a high melting point of 240C.

RIC 7 refers to any type of plastic that does not fit into the first six categories.

This system aimed to make it easier for average citizens to separate plastics which are considered more desirable, such as PET and HDPE, from other plastics which are less likely to be recycled, offloading some of the burden of sorting and separating to the persons generating the waste plastics and making plastic recycling and reuse more economically viable when compared with creating new plastics. However, this classification system suffers from overcomplication, confusing messaging, and lack of oversight or enforcement in many places internationally. As a result, even the desirable plastics PET and HDPE are recycled at rates as low as 30%. The invention simplifies and makes plastic recycling and reuse more economically viable when sorting or compared to creating new plastics."

In the building and construction industry, the term composite material refers to a mixture of aggregate with a fluid binding material, the resulting composite material being allowed to set into a durable solid. A well-known example of a composite material is concrete, in which the aggregate material is comprised of one or more of sand, gravel, crushed stone, or other similar particulate matter, and the binding fluid is a cement slurry.

This is a global problem which is continually worsening. Non-recycled plastic presents a significant overwhelming human and biosphere health hazard. Existing recycling methods involve sorting and separating the plastics which are easy to identify and/or process, and which plastic manufacturers are more likely to buy, from otherwise undesirable plastics. Currently, recycled plastic has value because it can be added to unrecycled so-called virgin plastic at a ratio of 1 to 9. The recycling process involves visually sorting using the RIC classifications. It results in 90% of the plastic ending up as litter, or in open pit or dirt covered landfill, or eventually making its way to the ocean.

At present, only sorted, separated, 100% pure plastic of the same type can be added to so-called virgin plastic at a ratio of 1:9. An alternate recycling method processes select plastics that are 100% pure. It involves a cracking process similar to those used in petroleum refining, except the input plastic is 100% pure recycled plastic. The output of the cracking process is a virgin plastic. Both methods require transportation and a specialized cracking facility and therefore have a very high carbon footprint. Worldwide about 9% of the discarded plastic is recycled in the two processes. The remaining 91% is non-recyclable and currently has no value and ends up as ground litter, floating plastic or in the best current disposal manner in open pits or dirt covered landfill.

A novel process is sought for converting large volumes of unsorted or minimally sorted waste plastic into a useful form, namely panels suited to construction and fabrication, said process being both economical and simple enough to be widely deployed and utilized, while being more environmentally friendly than current plastic recycling solutions or incineration. What is desired is a system and process that requires minimal sorting when compared to the stringent requirements for adding to RIC 1 and RIC 2 virgin plastics.

Waste plastic, particularly household/consumer plastics, currently faces recyclability challenges related to usefulness and marketability. Of particular concern are polystyrene foams including Expanded Polystyrene (EPS) and Extruded Polystyrene (XPS), commonly known as Styrofoam, which pose recycling difficulties and contribute to environmental pollution. These plastics fall under RIC 6. Polystyrene, a synthetic aromatic hydrocarbon polymer, is chemically composed of a long chain of hydrocarbon wherein alternating carbon centers are attached to phenyl groups, derivatives of benzene. It has the chemical formula $(C8H8)n$ and is constituted of carbon and hydrogen.

There are two principal forms of polystyrene: solid and foam. The foam variant is further categorized into Expanded Polystyrene (EPS) and Extruded Polystyrene (XPS). EPS is lightweight, waterproof, and commonly utilized in packaging and fast food containers. It is a closed-cell foam, typically available in the form of rigid panels, and can be customized with additives or external layers to improve its properties. XPS, produced through an extrusion process, has a denser and more rigid structure compared to EPS, making it suitable for applications such as deck lumber and insulation materials. Polystyrene foams, consisting of 95-98% air, possess excellent thermal insulation properties and are frequently employed as building insulation materials.

Polystyrene's mechanical properties are largely determined by the weak van der Waals forces between the polymer chains. The material is flexible and elastic due to the chains' ability to slide past each other upon heating or rapid deformation. This is facilitated by the viscoelastic and thermal insulation properties of polystyrene, especially above its glass transition temperature, which is around 100° C. Polystyrene also has a Vicat softening point of 90° C., which indicates the temperature at which the material begins to soften.

Chemically, polystyrene is relatively inert. While it is waterproof and resistant to degradation by most acids and bases, it is vulnerable to organic solvents such as acetone, chlorinated solvents, and aromatic hydrocarbon solvents. When combusted, polystyrene produces soot, carbon dioxide, and water vapor along with other thermal degradation by-products.

Recycling polystyrene is challenging due to the energy-intensive process of pyrolysis, which involves using high heat and pressure to depolymerize polystyrene into styrene. Additionally, the low density of polystyrene foam makes collection economically impractical. However, initial compaction can increase the material's density, transforming it into a valuable commodity for recycling. While polystyrene can be recycled by shredding and then extruding to form General Purpose Polystyrene (GPPS) pellets, most polystyrene products are not recycled due to the lack of collection infrastructure and economic incentive.

A lay-up process is a manufacturing process used in the creation and preparation of composite materials; specifically, it refers to a molding process for composite materials in which the final product is obtained by overlapping a number of different layers, usually comprising polymeric or ceramic fibers, in sequence with layers of a liquid binding substance which can be cooled or cured to induce bonding or hardening.

US20140228518A1 discloses methods for obtaining toughened products from unsorted post-consumer plastics. A toughened plastic composition is further disclosed, which includes a first thermoplastic polymer, a different second thermoplastic polymer, and a maleic anhydride-grafted ethylene/propylene rubber compatibilizer. U.S. Pat. No. 6,797,216B2 discloses a method to grind mixed plastics from ground polymeric particulates wherein polymeric scrap material, virgin polymeric material and mixtures thereof are supplied to intermeshing extruder screws which are rotated to transport the polymeric material along their length and subject the polymeric material to solid state shear pulverization and in-situ polymer compatibilization, if two or more incompatible polymers are present. Uniform pulverized particulates are produced without addition of a compatibilizing agent. US20210131041A1 discloses a lightweight universal panel mat made of plastic or elastomeric material which can be connected by insertion or snap-locking of one side to another, or by the use of fastening elements that more securely holds the sides together. Thus, similarly configured panel mats can be connected by interlocking to form a temporary support surface, deck, walkway, or roadway. DE102006054770B4 discloses a process for the recycling of all types of waste plastics, in particular mixed plastics (MBS), in which the optionally pre-sorted plastic is ground in at least one disc refiner in the presence of water, mechanically drained and dried from the refiner grinding material. ES2775611T3 discloses using talc as a filler.

As disclosed herein, there is a plurality of features in the present invention that are not found in the foregoing patents.

SUMMARY OF THE INVENTION

The present invention is a system and recycling process for converting waste plastic into a versatile building material suitable for use in the construction and fabrication of various structures and items. As used herein, waste plastic (and synonymously, plastic waste) is any household plastic that does not have recyclable monetary value. It can include industrial plastic waste if processes are used to mitigate, collect and neutralize any liquids or gases that have any human or harmful environmental side effects when heated. It further includes any non-sorted post-consumer and post-industrial plastic. The invention also claims a product resulting from the process. The recycling process comprises the steps of:

1. Acquiring a sufficient amount of unsorted, unseparated waste plastic;
2. Optionally separating polystyrene products including EPS and XPS from the waste plastic aggregate;
3. Processing said waste plastic into an aggregate via mechanical shredding;
4. Thoroughly mixing said plastic aggregate;
5. Sanitizing said plastic aggregate to remove unwanted residue;
6. Taking a sample of said plastic aggregate and partially melting said aggregate at low temperature;
7. Inspecting said sample to determine the ratio of solid plastic aggregate to melted plastic binding agent;
8. Adjusting the ratio of high-melting-point plastics to low-melting-point plastics in the bulk plastic aggregate so that there is more low melting plastic, wherein low melting plastic is defined as having a melting point of less than 180 degrees Celsius with 1:1 low melting to high melting plastic (greater than 180 degrees Celsius) being the lowest limiting ratio wherein the range of low to high melting plastic is preferably 3:1 to 30:1 and more preferably 7:1 to 9:1;

9. Melting the bulk plastic aggregate at a low temperature until it is a suspension of solid high-melting-point plastic aggregate in a fluid low-melting-point plastic mixture;
10. Forming the uncooled suspension into a desired shape;
11. Allowing the shaped suspension to cool; and
12. Removing the resulting composite material for immediate use, storage, transport, or further processing; further processing can include the application of a coating to the outer surfaces of the resulting composite material, said coating comprising the prepared and melted optionally—separated polystyrene products.

A more complete treatment of the recycling process is found in the detailed description below.

The material which results from the recycling process will be referred to as P-CORE™ (Plastic Core Of Recycled Everything) or as 'composite material'. The terms are to be considered interchangeable.

Additionally, this disclosure provides examples of potential end products which can be formed from P-CORE™, as well as uses for said end products in the construction and fabrication of various structures and items. P-CORE™ is intended in part to function as a replacement for commonly used construction materials such as deck lumber, particle board, fiberboard, and plywood, among common construction items others. A significant positive side effect is P-CORE™ is primarily composed of household plastics and does not create any hazardous manufacturing emissions or the addition of any hazardous or poisonous content in items made with PCORE™

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying Figures.

FIG. 12 is flowchart diagram showing the steps of a process for producing multilayered construction elements in one embodiment of the present invention;

DETAILED DESCRIPTION

Figure 1:
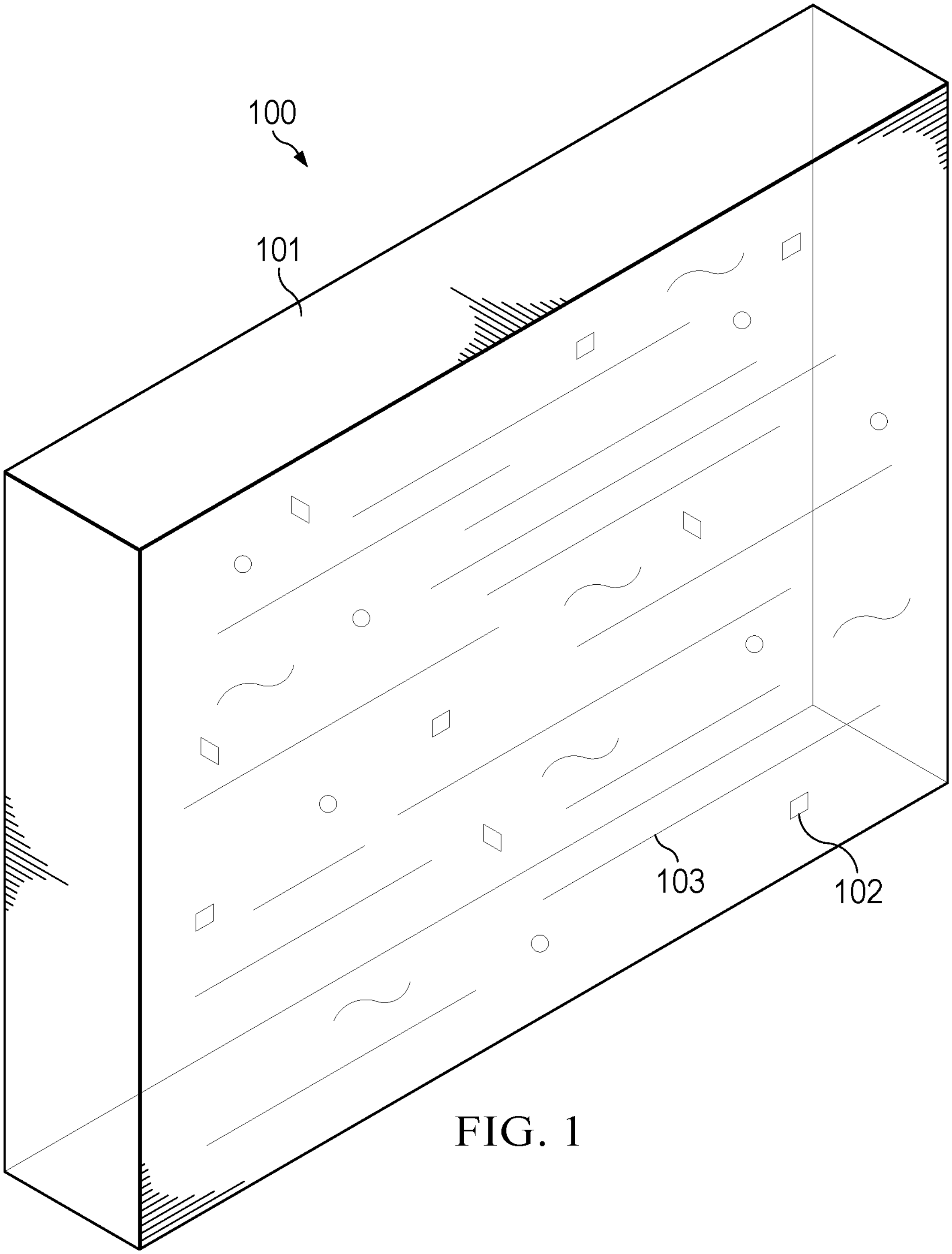
FIG. 1 is a top perspective view of a flat panel composed of composite material PCORE in an embodiment of the present invention showing internal composition.

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

The present invention is a system and recycling process for converting waste plastic into a versatile building material suitable for use in the construction and fabrication of various structures and items. In the preferred embodiment of the present invention, the recycling process comprises the steps of:

1. Acquiring a sufficient amount of unsorted, unseparated waste plastic of several different types having some roughly bimodal distribution of melting temperatures.
2. Optionally separating polystyrene products including EPS and XPS from the waste plastic aggregate via manual or automated mechanical process;
3. If said waste plastic is not already fully composed of shredded, chipped, flaked, powdered, or pelletized plastic aggregate, processing said waste plastic into such an aggregate via mechanically crushing or shredding said waste plastic.
4. Thoroughly mixing said plastic aggregate.
5. Sanitizing said plastic aggregate to remove food, chemical, and other residue, including cutting oil or lubricants.
6. Taking a small representative sample of the evenly mixed and sanitized plastic aggregate and subjecting said sample to a controlled partial melt and molding process in which the temperature of a heating element coupled to the sample is maintained between the peaks of the bimodal distribution of plastic melting temperatures for sufficient time that the low-melting-point plastics melt, thereby creating a suspension of solid high-melting-point plastic aggregate in a fluid low-melting-point plastic mixture comprised of a variety of plastics having melting points below the controlled temperature, said fluid mixture acting as a binding agent;

7. Visually inspecting the representative molded sample suspension and approximately determining the ratio of solid plastic aggregate to fluid plastic binding agent;
8. If the ratio of solid plastic aggregate to fluid plastic binding agent in the sample is not approximately 1:1, adjusting the bulk plastic aggregate ratio by processing and then mixing into the bulk plastic aggregate a sufficient amount of stored high- or eroding on the side of low melting plastic content. Add low melting-point waste plastic, as needed, in order to move the ratio toward approximately 1:1;
9. Transferring the bulk plastic aggregate to a temperature-controlled environment and subjecting said aggregate to the same controlled partial melt as the representative sample until it is a suspension of solid high-melting-point plastic aggregate in a fluid low-melting-point plastic mixture;
10. Forming the uncooled suspension into a desired shape and introducing supplemental materials or elements if desired.
11. Cooling the shaped suspension so that it solidifies, becoming a shaped piece of composite material; and
12. Removing the composite material for immediate use, storage, transport, or further processing; further processing can include the application of a coating to the outer surfaces of the resulting composite material, said coating comprising the prepared and melted optionally-separated polystyrene products.

The material which results from the recycling process will be referred to as P-CORE™ (Plastic Core Of Recycled Everything) or as 'composite material'. The terms are to be considered interchangeable herein.

In step 3 of the recycling process, note that any non-melting contaminates included with the waste plastic such as plastic caps, foil, paper labels, or stickers will also be shredded or otherwise processed and included in the resulting plastic aggregate. These contaminates are tolerable as long as their volume compared to the volume of solid plastic aggregate and binding mixture is negligible.

Between steps 5 and 6 of the recycling process, care must be taken to ensure the aggregate is dry before heating to avoid pockets of water vapor in the suspension. This may be accomplished by applying relatively low heat to the sanitized aggregate for a sufficient period of time to minimize residual moisture or by simply waiting a sufficient period of time for residual moisture to evaporate.

The taking of a representative sample of the plastic aggregate in step 6 and determination of the mixing ratio of high-melting-point to low-melting-point plastics in said plastic aggregate in step 7 should be performed on a regular basis to ensure all composite material products resulting from the recycling process have a value of approximately 1:1 for said mixing ratio. Although 1:1 is the desired mixing ratio, it is acceptable to deviate from this value as long as the solid high-melting-point plastic aggregate makes up less than half the volume of the sample. In an embodiment, additional tests may be performed on a sample after cooling said sample into a composite material such as a bending test performed by hand or by machine, or a test for vapor pockets by cutting or slicing said cooled sample into several pieces by handsaw or other cutting device.

In step 8 of the recycling process, a suitable high-melting-point plastic for adjusting the aggregate ratio is PET; suitable low-melting-point plastics include HDPE, LDPE, and PP or any low melting less than 190° C. non-recyclable plastic. Depending on the type, the melting point of PVC can range from low to high temperatures.

In step 10 of the recycling process, the uncooled suspension may be formed into a desired shape via a flat sheet press or other mechanical press, by pouring into slabs or molds, or by injection molding. The desired shapes can vary in thickness, and be ribbed, corrugated, or honeycombed. These honeycombs can be filled with an insulating material such as expanded polystyrene to reduce weight while also reducing the transmission of noise and heat. Further, the supplemental materials to be introduced can comprise relatively longer strips or strands of processed, sanitized, high-melting-point waste plastic such as PET. These longer elements can be arranged or aligned in the uncooled suspension so that they impart additional tensile strength to the resulting composite material.

In steps 6 and 9 of the recycling process, the temperature of the heating element coupled to the plastic aggregate should be maintained between approximately 180C and 220C, which falls between the highest melting point of the low-melting-point group at 173C for polypropylene and the lowest melting points of the high-melting-point group at 240C for polystyrene, for a sufficient period of time that the low-melting-point plastics are completely melted and form a binding substrate encapsulating the solid high-melting-point plastic aggregate filler. Ideally the temperature of the heating element coupled to the plastic aggregate will be maintained between approximately 198C and 202C for the same sufficient period of time. The heating element can be a controlled temperature heat source such as a propane or wood flame or electrical heater. The heating element must be controllable and can include some form of feedback on heating element temperature such as a digital temperature display coupled to a thermocouple or a high-temperature mercury thermometer or similar device. In the absence of direct feedback, the temperature of the heating element can be increased incrementally until the low-melting-point plastics are completely melted.

In step 11 of the recycling process, in one embodiment of the present invention, the shaped suspension is allowed to cool and solidify naturally. In another embodiment, the rate of cooling of the shaped suspension in step 11 is controlled via active and/or passive heating and/or cooling devices in order to direct the behavior of the cooling suspension as it solidifies and thereby affect the properties of the resulting composite material.

Steps 9, 10, and 11 of the recycling process can be accomplished in a single machine such as a large flat sheet press having a controllable heat source.

In step 12 of the recycling process, further processing can comprise additional forming or shaping via grinding, sanding, cutting, sawing, bending, drilling, or other machining method; additionally, if the cooled composite material adheres to the device or machine in which it was shaped or cooled, surfaces in contact with said cooled composite material can be made out of material less likely to adhere to the same, and/or a release agent may be applied to said contacting surfaces to reduce adhesion.

The waste plastic processing via crushing or shredding in step 3, the plastic aggregate mixing in step 4, the plastic aggregate sanitizing in step 4, the sample collection and sample heating in step 6, the plastic aggregate transferring and heating in step 9, the forming of the uncooled suspension in step 10, the cooling of the formed suspension in step 11, and the removing of the composite material in step 12 may each be performed manually by the action of a person or persons or automatically by a purpose-built machine; additionally, each of the above actions may be performed separately with the working material transferred between stations by a person or persons, or as part of an integrated factory line in which the working material is moved between stations automatically via conveyance devices; further, the recycling process may be performed on a rolling basis as a continuous processing stream or on a discrete basis in batches of a pre-determined size.

In another embodiment of the present invention, the recycling process is identical except that the waste plastic of step 1 is separated into two groups prior to processing and mixing, the two groups being low-melting-point plastics and high-melting-point plastics. As a result, the mixing ratio of low-melting-point to high-melting-point plastic aggregate can be controlled at the point of mixing and need not be determined via sampling and inspection or adjusted via addition of stored plastic aggregate, eliminating the need for steps 6-8. This does introduce an initial sorting and separating step however.

In another embodiment of the present invention, the entirety of the bulk plastic aggregate is not sanitized as indicated in step 5 of the recycling process. Instead, step 5 is eliminated and the need for sanitization of any bulk plastic aggregate is judged on a continuous basis during the determination of the mixing ratio of the representative sample. If the sample is judged to have sufficient residue, the bulk aggregate from which it was taken is then sanitized. This eliminates a step and reduces wasting of water and sanitization chemicals on already-clean plastic aggregate.

Prior to the steps of the recycling process, waste plastic at landfills or storage sites, if thoroughly mixed, can be bulk compressed into large square or rectangular bales for ease of transport and processing. The mix and density of the bale resulting from the bulk compression process can be controlled so that said bales, once delivered to the recycling process site, can be cut into slabs by a band saw, water jet, or other cutting device, such that each of said slabs is the proper volume for batch processing via the recycling process of the present invention.

The properties of the composite material product resulting from the recycling process can be controlled by introduction of additives to the working material during specific points of said recycling process. For example, to mitigate plastic binding issues between dissimilar types of plastic, a commercial plastic binding agent may be introduced to the plastic aggregate prior to melting.

Additionally, in an embodiment, an alternative layered form of the P-CORE™, composite material can be produced by introducing a thin layer or layers composed of oriented, staggered, and/or overlapping strands of a high-melting-point material such as PET, said strands having one or more dimensions of relatively large size as compared with the dimensions of the high-melting-point plastic aggregate filler elements. Other acceptable strand materials include any high-melting-point plastic, as well as steel or aluminum, or organic fibers such as in carpet or wood chips. A layered composite material product, for example a flat panel, may comprise one or more of a bottom strand layer, top strand layer, or middle strand layer. These layers are included to increase the panels bending strength. A panel in bending will put a skin layer that is on the opposite side of the force of the panel into tension. The skin layer that is on the same side as the applied force will be put into compression. This mechanical phenomenon occurs because the inner core will act as the center of rotation for the outer layers to rotate around. The result of adding one or two layers is a stronger panel that has improved bending strength. Hence or consequently the invention becomes the key center of rotation for the outer stranded layers.

In another element of the present invention, a process to produce and orient said strand layers or any small polygonal (N-RP)=Non-Recyclable Plastic shapes may be integrated into the recycling process in order to produce said layered P-CORE™, products. In an embodiment, using a strand material of PET sourced from discarded PET beverage bottles, said strand production process comprises the steps of:

1. Acquiring or sorting and separating a sufficient amount of polygons strand material to enable the recycling process on a continuous or batch basis as desired;
2. Cutting or slicing the strand material into long and narrow strands;
3. Optionally transferring the waste material resulting from step 2 such as screw-top cap sections and curved bottom sections of bottles to the waste plastic input of the recycling process to be processed by shredding or crushing into high-melting-point aggregate;
4. Flattening the strands of step 2 for ease of later orientation;
5. Optionally treating the strands to improve adhesion with the low-melting-point plastic binding substrate;

In step 2 of the strand production process, the dimensions of resulting strands are narrow strips approximately ½ inch to 1 inch wide and approximately 3 inches to 6 inches long.

In step 4 of the strand production process, the strand flattening may be accomplished by manual or automatic machine using heat and/or mechanical pressure. In an embodiment in which the chosen strand material is a metal such as aluminum, the flattening of step 4 can be accomplished using a three-roller straightening process.

In step 5 of the strand production process, it may be necessary to create a rough or acceptable adhesion surface on PET, Aluminum or steel strands with a binder to assure adhesion with the low temperature melting mix of polymers. This can be accomplished with a chemical dip and rinse process.

Manufacturing a P-CORE™, composite board comprising high-melting-point unraveled natural fiber, glass fibers, or plastic fibers, is best suited for a process that applies pressure along with thermoforming the plastic aggregate mix. This will assure that any gas or air will be excluded forming it into a strengthened layered of composite material. The heated conglomerate mix can be injected into molds or laid down as a molten sheet if the molds and sheet forming beds are maintained at 180C to 200 C. P-CORE™, structures can have significantly improved tensile strength by adding strategically located layers composed of non-recyclable plastic oriented strands or small polygonal shapes Further, if a fire-retardant composite panel is desired, then a powdered fire prevention chemical like aluminum trihydrate (ATH) can be added to the plastic aggregate prior to or during the mixing of step 3 of the recycling process. To assure that the fire retardant and binding powder provide the required fire retardancy and bind to the exposed top and bottom layers of a composite material panel they can be briefly exposed to a flame which softens the top layer of the (PET) plastic strands.

P-CORE™, panels can have a myriad of thin attractive pattern and color combinations. These can be created by shredding & applying this selected shredded plastic mixture as a thin layer just before the final press, heat, and cool process. An excellent source of colored stock, for creating colorful P-CORE™, sprinkled on patterns, is solid colored drink & food caps. These caps are plentiful but currently are considered as non-recyclable plastic due to clogging the compacting equipment.

This disclosure additionally claims examples of potential end products for the P-CORE™ composite material resulting from the recycling process. P-CORE™, can replace the materials used to make items presently used in residential and commercial construction. For example, flooring, wall panels and roof panels, furniture and household items that can tolerate a composite material of plastic aggregate in plastic binding. One primary goal of P-CORE™, is to replace large construction panels such as Particle Board (PB), Medium and High-Density Fiberboard (MDF & HDF) or Wood Fiber Oriented Strand Board (OSB), Laminated Veneer Lumber (LVL), Plywood (PLW). P-CORE™, is an ideal core material for panel boards that require a tough, surface covering or enhanced surface that may require a decorative, strong, tough, scratch proof surface like a simulated wood veneer. P-CORE™, can also be honeycombed to reduce weight. The P-CORE™, material is an ideal substitute for composite construction if it has oriented strands of high strength material included. P-CORE™, can be used as wall panels, separation panels, insulation panels, and flooring, as well as laminate flooring, tiles, furniture, and related applications. In a further embodiment, the invention can be formed into a loading pallet.

The resulting P-CORE™, products are intrinsically water, mildew and rot proof eliminating the need for vapor seals like a residential wall wrap, tar paper under roof shingles, or waterproof boards for shower stall walls and underlayment under toilet seats.

The recycling process which produces P-CORE™, composite material products must accomplish this without degrading the inherent tensile strength of the high-melting-point plastics present as aggregate, strands, or layers. The adhesion qualities must provide end products that meet specifications including strength, and rain and wind resistance. Said end products also need to meet the minimum UL requirements for mechanical strength, dimensional stability, fire resistance and UV radiation aging.

P-CORE™, as a flat roofing panel with overlapping joints provides a fire and waterproof, primary one layer roof underlayment system. It eliminates the need for tar paper under the shingles. It has the potential to eliminate the use of plywood or wood underlayment. A very simple overlapping joint system provides a one-layer water resistant roof panel system that is shingle ready and waterproof until the shingles are installed.

P-CORE™, as corrugated roofing panels in temperate and tropical areas can be used as an overlapping primary single layer roofing system that resists rain and light snow loads. For this purpose, it does not need to be transparent or translucent like corrugated fiberglass. For cold snowy climates it will need a strong rafter support system. The underside of a P-CORE™, Corrugated panel can be encased with recycled expanded polystyrene to act as insulation.

P-CORE™, as a flat flooring panel will be a thick single layer flooring that has an interlocking edge system. Several interlocking designs are possible but the simplest is a matching triangular projection that interlocks with a matching triangular groove. If waterproofing is required a waterproof caulk can be injected into the triangular groove before the adjacent panels are locked together. The triangular groove system keeps the panel seam smooth, eliminates squeaks, strengthens the unsupported sections and with caulking is waterproof. The top layer can have a uniform color or decorative texture.

P-CORE™, kitchen countertop with P-CORE™, used as the core material. The top layer can be composed of a conventionally produced plastic layer to provide common countertop characteristics like heat resistance, toughness, hardness, scratch proofing, smoothness, coloring or texturing. Alternately, a one-layer P-CORE™, countertop can be cut, sanded, and polished to a smooth glossy finish. It will make a tough water and stain resistant finish that can be disinfected with food safe cleaners.

Using P-CORE™, as the primary material or incorporated as a core building material, kitchen and bathroom cabinets and vanities can be constructed with P-CORE™. The kitchen or bathroom cabinet and vanities would be built using a two-layer panel system. The core material can be honeycombed to reduce weight. The sink top layer is a tough, hard, scratch resistant, smooth, colored surface, comprising a P-CORE™, top layer with various wood finishes. They could also be smooth and colored with a myriad of patterns and textured surfaces. Additionally, P-CORE™, can be formed into a single molded small single sink and vanity combination. The sides and sink basin can be colored, smoothed and polished. A honeycombed P-CORE™, can be a light weight, strong, low-cost alternative to plywood. It will be impervious to rot and mildew and easy to transport.

In an embodiment, P-CORE™, can be used as underlayment for shower stalls and flooring under toilets. The most significant advantages are it is a waterproof, single layer, low-cost panel flooring system used everywhere. In an embodiment, the floor panels comprise V groove edges that can be caulked for waterproofing.

In another embodiment, P-CORE™, is used as water-resistant flooring in front of any doorway that has access to the outside.

In an embodiment, P-CORE™, construction elements are used to provide basic housing in impoverished, temporary, or emergency situations. These shelters require a waterproof roof, wind resistant walls, doors and elevated floors to prevent rising water during excessive rain. The most common need is a shelter that is dry and wind proof.

There are many temporary emergency shelters designs. Construction ranges in complexity and weight from rigid sheds to pop up backpack tents. Affordable canvas tents are an acceptable temporary shelter, but they are temporary, not insulated and are not stable in medium to strong wind speeds. A significant issue for canvas is fatigue caused by wind. In windy environments the canvas is flexed and particularly because of wear with the support structure from the constant flexing. A standard sized tent that is adequate as a shelter has a footprint of 12' wide×12' long with ~6' side walls. Higher ceilings can be created by placing the side panels on blocks or P-CORE™, plastic blocks molded from non-recyclable plastic with sand or dirt added as weight.

For an elevated floor to avoid rain created flooding dirt, sand or gravel can be used as the filler inside the block wall that raises the tent and also raises the tent floor. P-CORE™, flat panels with interlocking edges can be used to cover a dirt floor. A P-CORE™, flooring panels has several advantages including insulation, smoothness for cleaning, and the ability to be shaped for interlocking to wall components in order to reduce bug, snake and spider infiltration.

There are many temporary emergency shelters that can be purchased or are provided by FEMA—Federal Emergency Management Agency. The construction ranges in complexity and weight from rigid sheds to pop up backpack tents. Expense, difficult of assembly, and transportation are a serious issue. P-CORE™, plastic can be used in many of these shelters as a low-cost raw material that is locally, economically, and readily available. The P-CORE™, design goals and selection criteria are basically controlled by the length of time it will be used. This is difficult to determine in an emergency. The solution is to have an easily set up shelter that are transformable from emergency needs to a permanent dwelling.

In a further embodiment, P-CORE™, construction elements enable a strengthened car canopy or cabin tent using P-CORE™, plastic, molded into a plastic anti-flap frame, installed to add rigidity to the side walls of a cabin tent or car canopy. The need for the strengthening frameworks is controlled by the length of time it is estimated a tent will be used as an emergency shelter, which can be difficult to determine in an emergency. The solution is to have an anti-flap wall device that can be easily added after the tent is installed. In an embodiment, the external folding frame comprises steel strips molded just under the surface under the entire length of each member. The tent wall will be captured between magnetized internal strips that are magnetically attracted to the external folding rigid P-CORE™, having external steel strips that are molded into the frame.

In another embodiment, P-CORE™, construction elements enable a short term, cabin tent for emergency use. Cabin tents are a currently accepted emergency shelter. The tent wall comprises a bottom wall extender approximately 6"-8" in width to allow weighting elements such as dirt, sand, or gravel to be added. Cabin tents currently house 2-6 people, are easy to assemble and disassemble, are compact, transportable, lightweight and the sides are resistant to rain. With minor improvements the sides are made wind resistant to reduce flapping.

In a further embodiment, P-CORE™, construction elements enable a longer term cabin tent or car canopy, comprising anti-flap wall frames to prevent tent side wall flapping. A long-term use of a cabin tent or car canopy comprises a tent wall which is raised using hollow P-CORE™, bricks filled with a weighting element such as dirt, sand, or gravel. These will become a weight system to provide hold down support in high wind conditions. First, the P-CORE™, floor and brick elements are filled with weight such as dirt, sand or gravel. Next, the P-CORE™, tent pole elements are attached to the P-CORE™, bricks and retainer wall to provide wind resistance. In an embodiment, The tented cabin further comprises shaped P-CORE™, floor panels that have overlapping edges to create a smooth, continuous floor. The undersurface of these panels can be honeycombed to reduce weight. The overlapping edges can be attached with screws to make a smooth floor covering. In an embodiment, the tented cabin further comprises a folding P-CORE™ entrance frame that has a swinging door, a window and a substantial door latch. The bottom wall flap extends over the brick retainer wall to direct runoff from the roof and walls away from the tent floor.

In another embodiment of the present invention P-CORE™, composite material construction elements comprise flat 301 and corrugated 400 panels used for shower stalls, toilet flooring, roofing, flooring and wall paneling. Additionally, shaped corrugated roofing panels can be overlapped one corrugation for rain proofing. In a further embodiment of the present invention, P-CORE™, composite material construction elements comprise kitchen and bath countertop, kitchen and bath cabinets and vanities side walls, said construction elements can be honeycombed for weight reduction; in another embodiment, construction elements are combined to create furniture with and without veneer, round or square shelter constructions having corrugated walls and roof, and tented cabin shelters.

In an embodiment, the embedded oriented strands are laid in a single layer, not overlapping, at approximately 45° angle with regards to the long axis of the associated flat panel element; multiple tensioned strands or filaments or threads 103 of (PET) plastic can be embedded to increase the bending strength of a panel 101.

Figure 9:
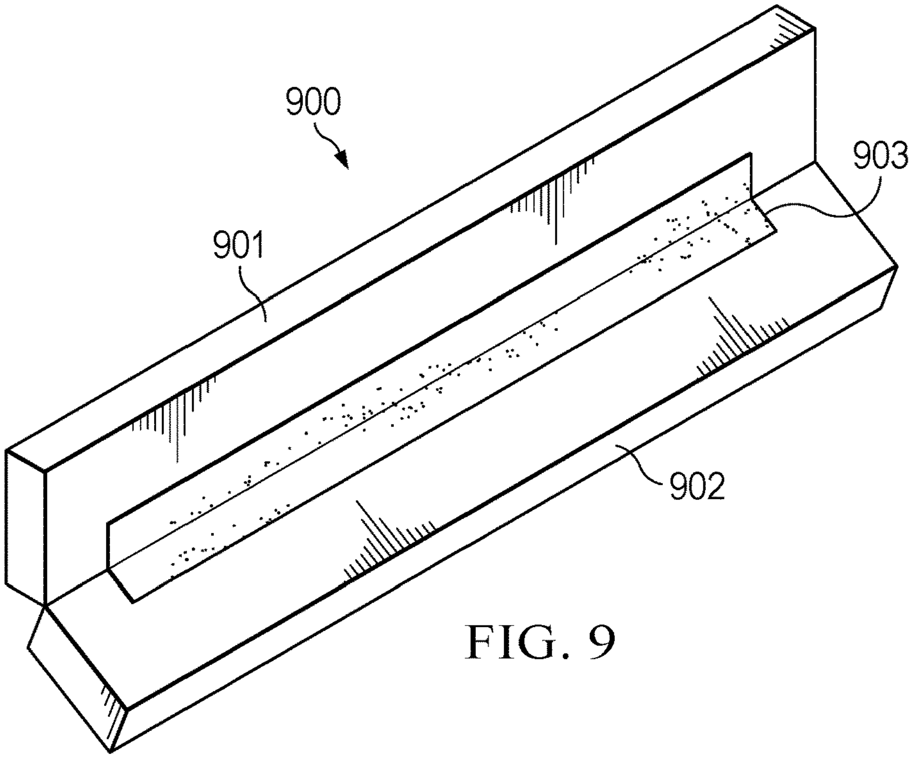
FIG. 9 is a perspective view of a hinging connector comprising construction elements in an embodiment of the present invention.

In an embodiment, to construct an end table furnishing 600, a flat panel and universal hinging connectors, as in FIG. 9, are used; top, legs and leg supports can be cut off with a sawing means. Screw installation can be accomplished by conventional means or using, e.g., a solar rechargeable drill. Self-tapping screws are used to attach universal connectors and legs to tabletop.

In an embodiment, a P-CORE™, shelter 700 (round or square with rounded corners) having corrugated walls 701 and roof 703 comprises roof P-CORE™, triangular flat panels, with raised edges that interlock; ceiling joist are universal hinging connectors with a center post to support the roof. Side walls are P-CORE™, corrugated panel. The structure is constructed and erected similarly to a metal corrugated grain silo. The floor can be raised with sand, dirt or gravel. P-CORE™, floor panels can then be placed on leveled dirt floor and fastened together. Swinging door with latch and window can be cut into wall and P-CORE™, door and window frame installed. P-CORE™, bricks filled with dirt, sand or gravel are positioned on the ground around the perimeter of the silo. The silo wall is attached with right angle clips and screws to P-CORE™ bricks.

FIG. 1 is a top perspective view of a flat panel composed of composite material PCORE in an embodiment of the present invention showing internal composition, in which the following elements can be seen: flat panel composed of composite material P-CORE™, 100; suspended plastic filler elements of random shapes and dimensions, said elements having a high melting point, said elements being oriented in random directions or otherwise placed without orientation 102; binding plastic substrate element 101; suspended plastic filler elements having a high melting point and similar dimensions being oriented in a common direction 103.

Figure 2:
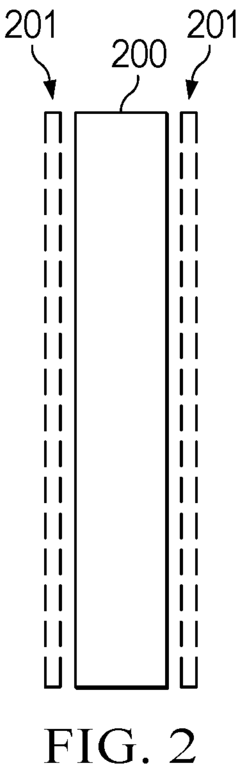
FIG. 2 is a side planform view of a flat panel composed of composite material P-CORE™, in one embodiment of the present invention.

FIG. 2 is a side planform view of a flat panel composed of composite material P-CORE™, in one embodiment of the present invention, showing flat panel 200 having top and bottom layers which can be covered with oriented strands of PET, steel or plastic (201); said oriented strands having dimensions of approx. 4-6" by ½", in relation to standard flat panel thickness varieties of ⅛, ¼, ½, ¾, and 1".

Figure 3:
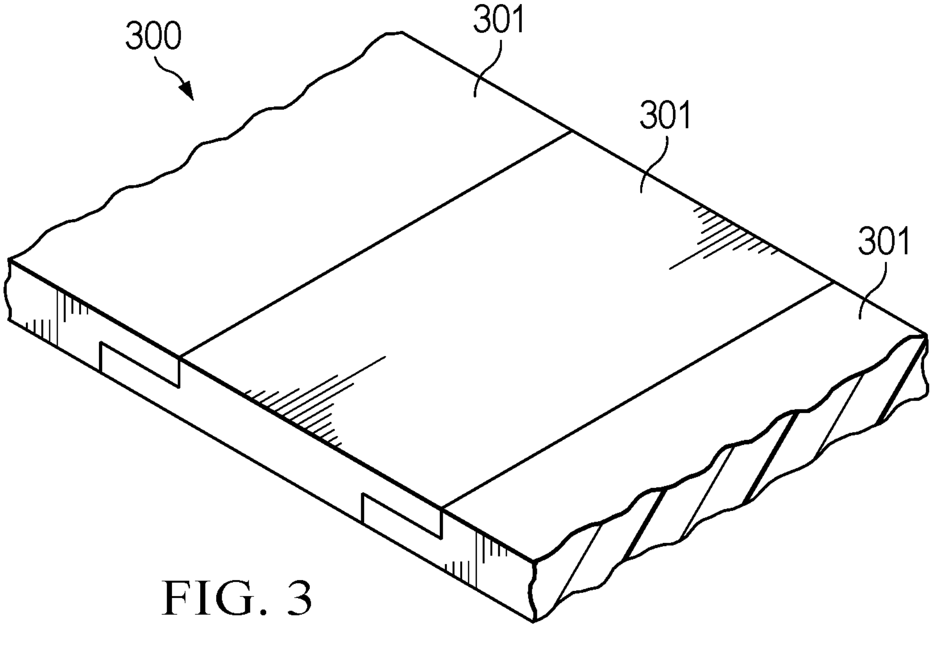
FIG. 3 is a top perspective view of a flat panel composed of composite material P-CORE™, in one embodiment of the present invention showing overlapping shaped panels.

FIG. 3 is a top perspective view of a flat panel composed of composite material P-CORE™, 300 in one embodiment of the present invention showing overlapping shaped panels 301.

Figure 4:
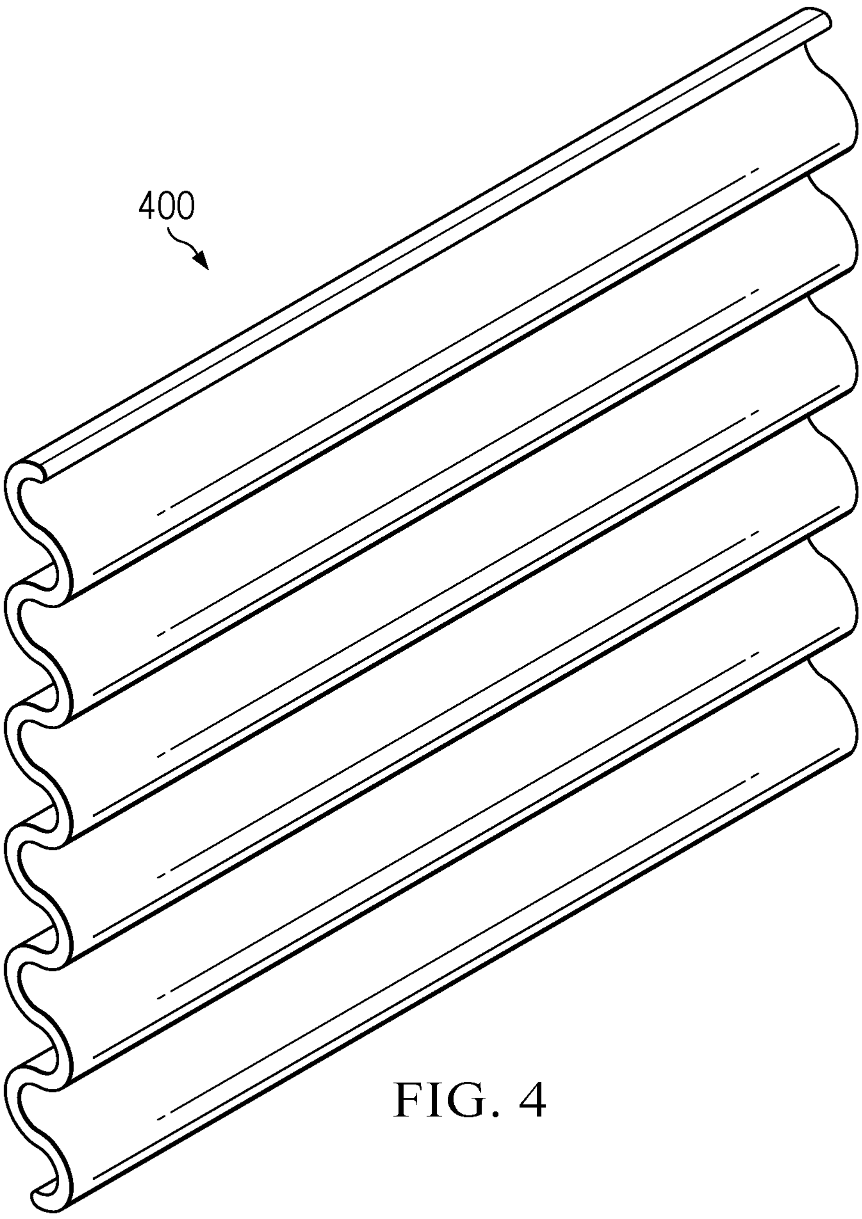
FIG. 4 is a perspective view of a corrugated shaped panel composed of composite material P-CORE™, in one embodiment of the present invention.

FIG. 4 is a perspective view of a corrugated shaped panel 400 composed of composite material P-CORE™, in one embodiment of the present invention.

Figure 5:
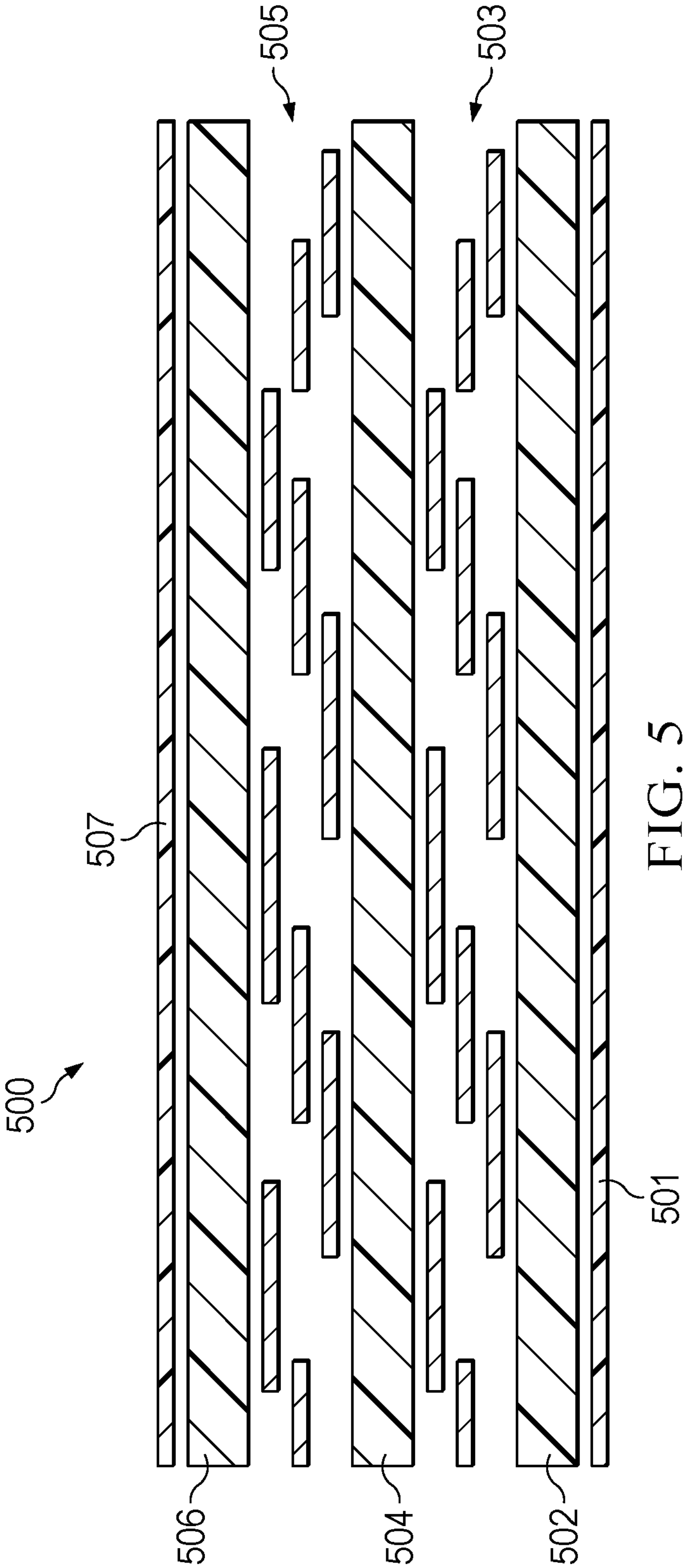
FIG. 5 is a side-planform, exploded view of the layers of a construction element in an embodiment of the present invention.

FIG. 5 is a side-planform, exploded view of the layers of a construction element in an embodiment of the present invention, wherein construction element 500 comprises multiple layers of differing compositions: bottom decorative layer 501; lower P-CORE™, layer 502; lower strengthening filler layer 503; middle P-CORE™, layer 504; upper strengthening filler layer 505; upper P-CORE™, layer 506; and top decorative layer 507.

Figure 6:
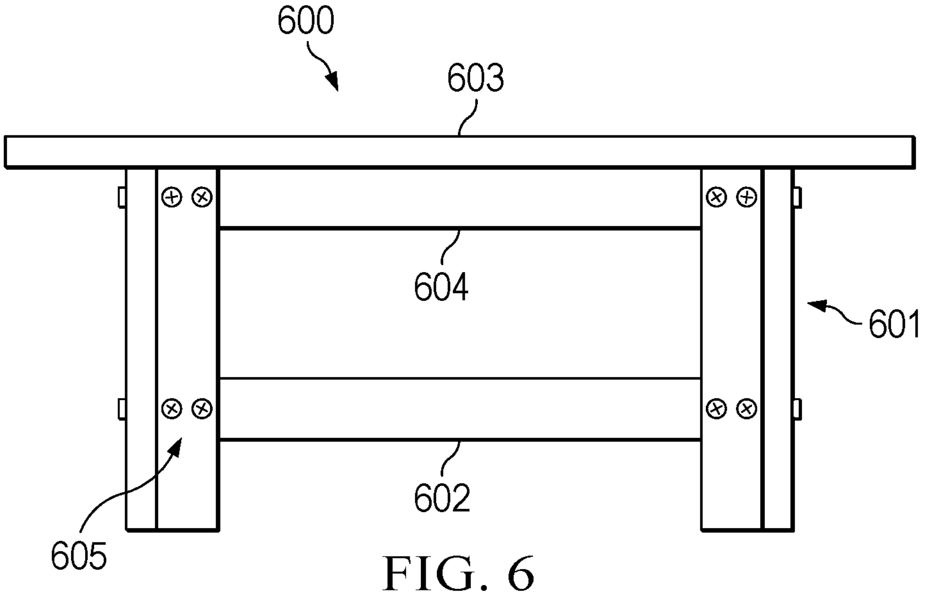
FIG. 6 is a side-planform view of an end-table composed of construction elements in an embodiment of the present invention.

FIG. 6 is a side-planform view of an end-table composed of construction elements as an example of a furnishing product in an embodiment of the present invention; said end-table 600 comprising multiple construction elements composed of composite P-CORE™, material; 4 universal connectors 601 as legs, beams 602 for bracing, tabletop 603, upper bracing 604, attachment screws 605 as needed.

Figure 7:
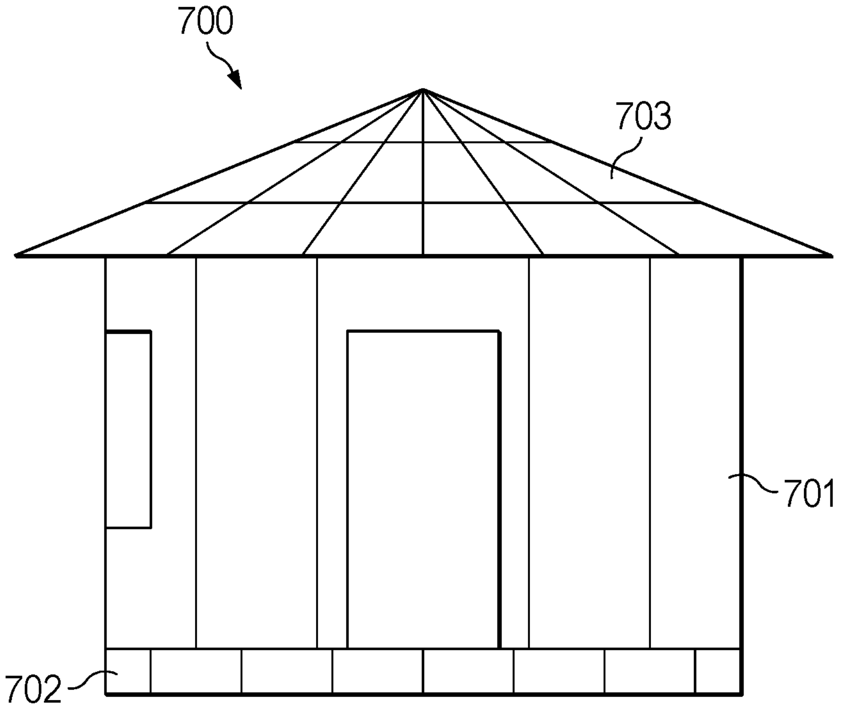
FIG. 7 is a side-planform view of a round shelter structure composed of construction elements in an embodiment of the present invention.

FIG. 7 is a side-planform view of a round shelter structure 700 comprised of construction elements in an embodiment of the present invention; construction elements comprise wall panels 701, weighted bricks 702, and overlapping roof panels 703.

Figure 8:
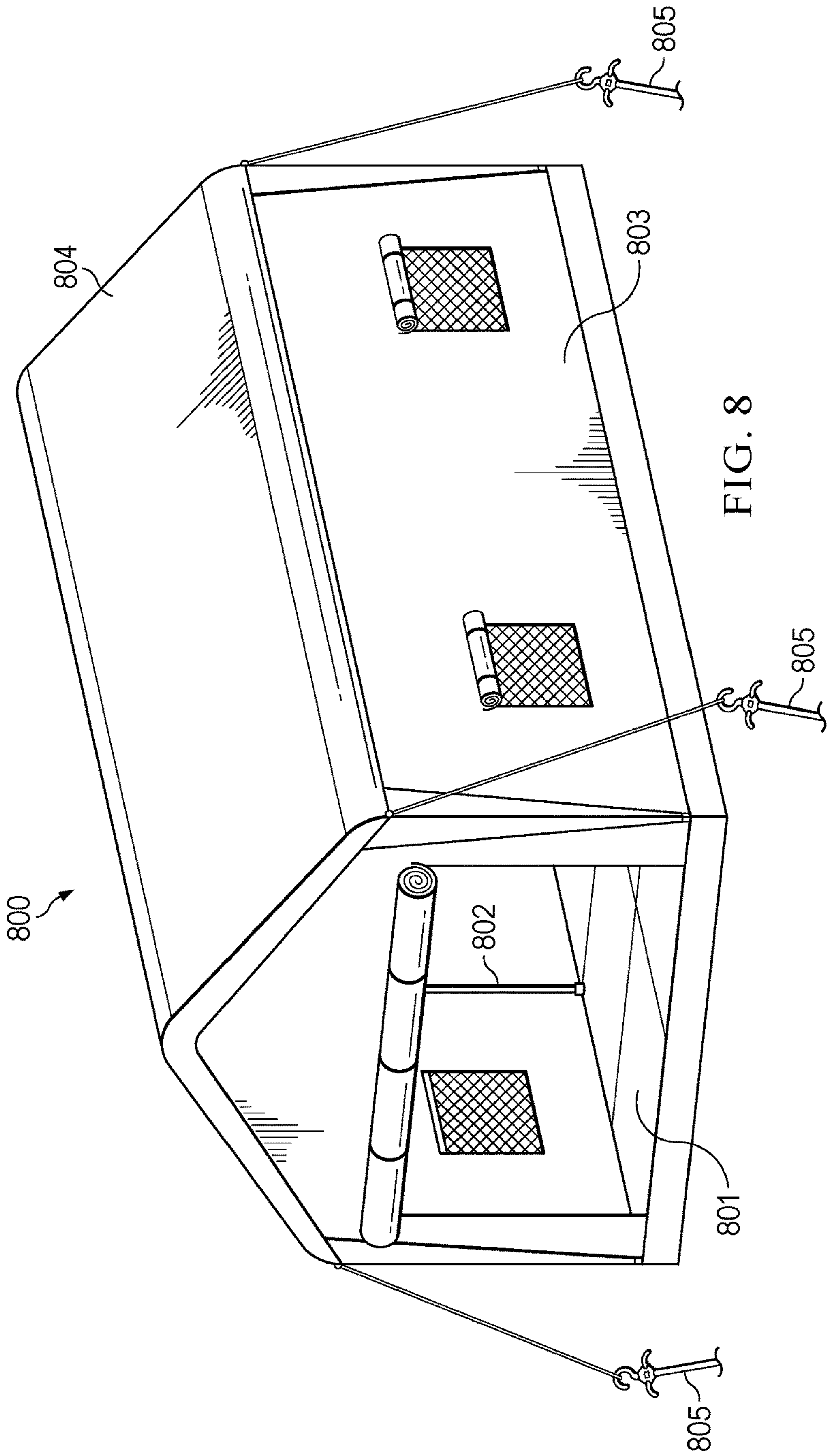
FIG. 8 is a perspective view of a tented shelter structure comprising construction elements in an embodiment of the present invention.

FIG. 8 is a perspective view of a tented shelter structure 800 comprising construction elements in an embodiment of the present invention; construction elements comprise floor panels 801, poles 802, canvas walls 803, canvas roof 804, securing anchors 805. Other elements include weighted bricks.

FIG. 9 is a perspective view of a hinging connector 900 comprising construction elements in an embodiment of the present invention; said construction element universal connector 900 comprising two beams 901 and 902 coupled by a strip of flexible textile 903 to allow for hinging/folding motion of the beams with respect to each other, or for angled positioning of one beam with respect to the other.

Figure 10:
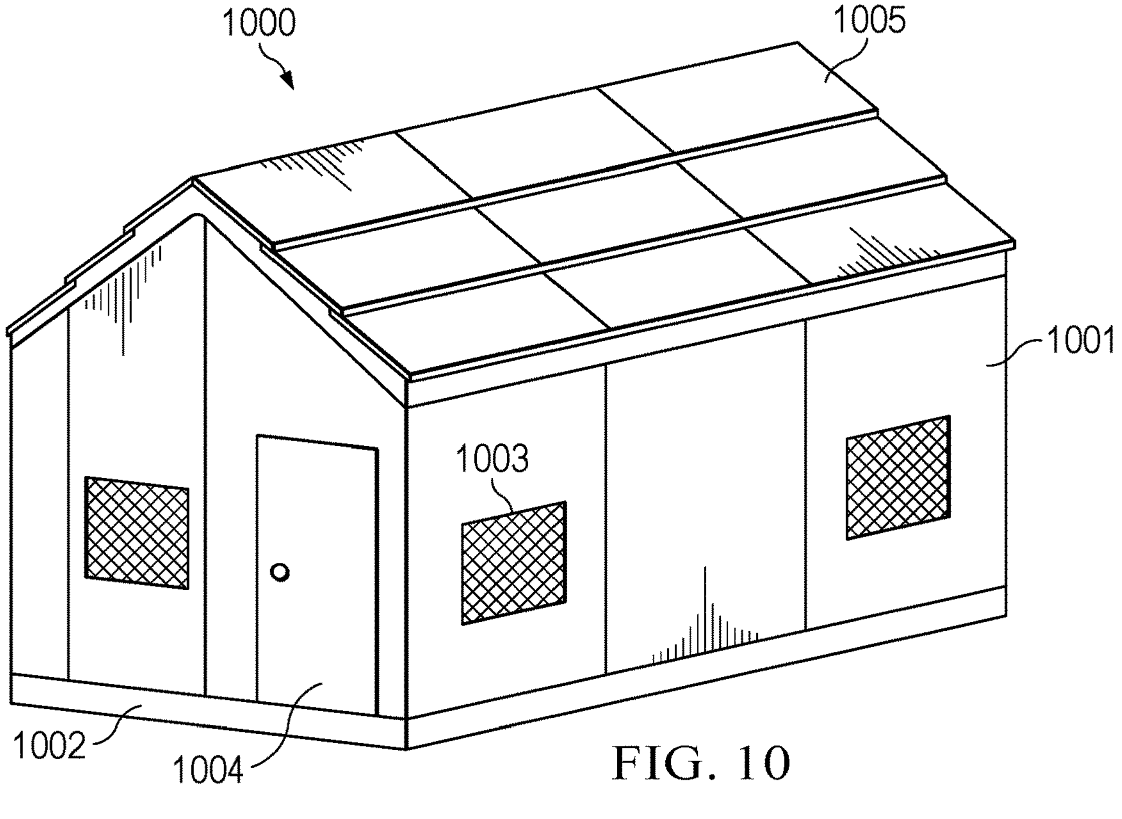
FIG. 10 is a perspective view of a roofed structure composed of construction elements in an embodiment of the present invention.

FIG. 10 is a perspective view of a roofed structure 1000 composed of construction elements in an embodiment of the present invention; said example structure 1000 having a sloped roof, with construction elements comprising wall panels 1001, floor panels 1002, cutout windows 1003 and door 1004, overlapping roof panels 1005, said construction elements being shaped or flat panels formed out of P-CORE™, composite material.

Figure 11:
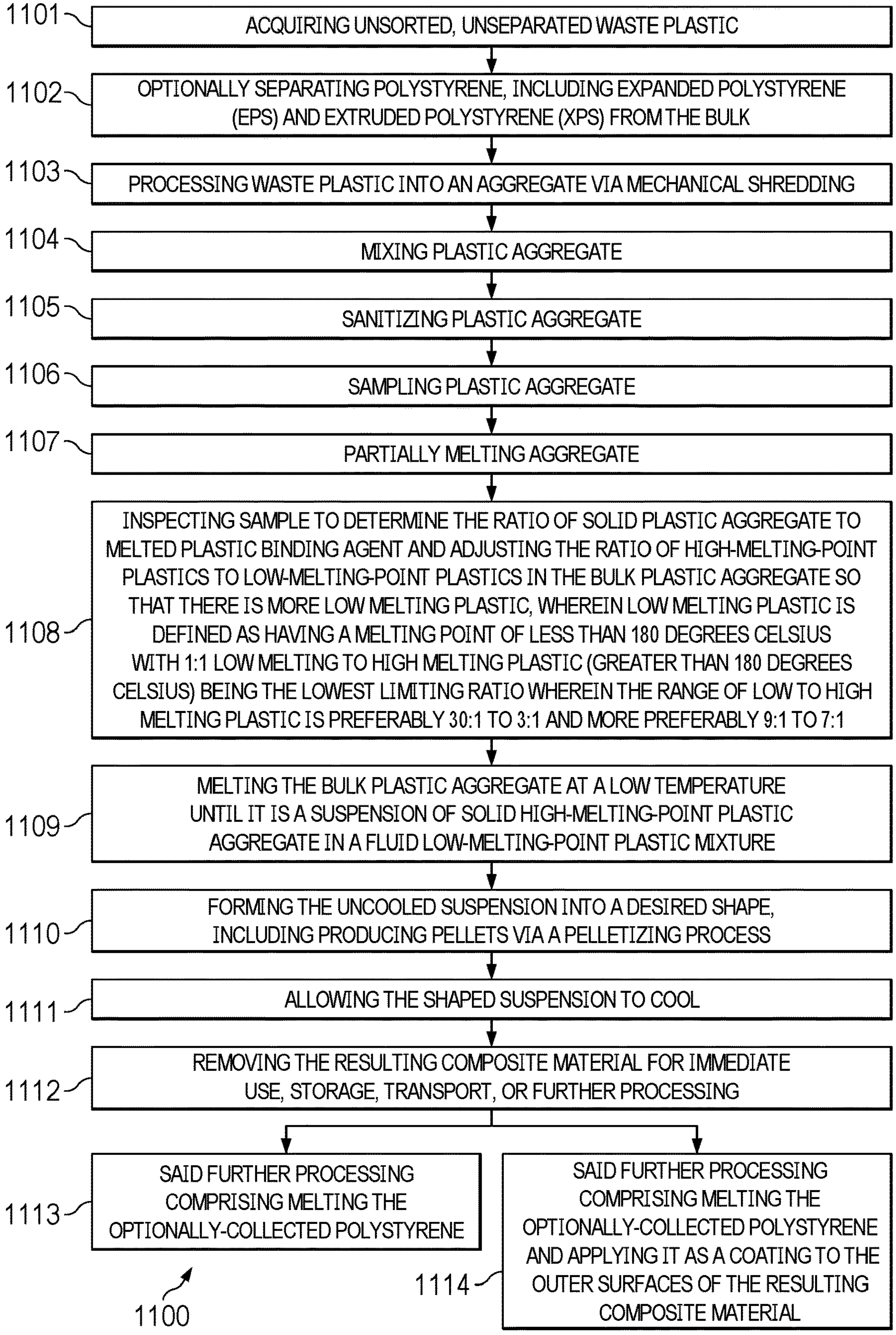
FIG. 11 is a flowchart diagram showing the steps of a process for producing the composite P-CORE™, material, in one embodiment of the present invention.

FIG. 11 is a flowchart diagram showing the steps of a process 1100 for producing the composite P-CORE™, material, in one embodiment of the present invention; said steps comprising:

1101 Acquiring unsorted, unseparated waste plastic;

1102 Optionally separating polystyrene, including expanded polystyrene (EPS) and extruded polystyrene (XPS) from the bulk;

1103 Processing waste plastic into an aggregate via mechanical shredding;

1104 Mixing plastic aggregate;

1105 Sanitizing plastic aggregate;

1106 Sampling plastic aggregate;

1107 Partially melting aggregate;

1108 Inspecting sample to determine the ratio of solid plastic aggregate to melted plastic binding agent and adjusting the ratio of high-melting-point plastics to low-melting-point plastics in the bulk plastic aggregate so that there is more low melting plastic, wherein low melting plastic is defined as having a melting point of less than 180 degrees Celsius with 1:1 low melting to high melting plastic (greater than 180 degrees Celsius) being the lowest limiting ratio, wherein the range of high to low melting plastic is preferably 30:1 to 3:1 and more preferably 9:1 to 7:1;

1109 Melting the bulk plastic aggregate at a low temperature until it is a suspension of solid high-melting-point plastic aggregate in a fluid low-melting-point plastic mixture;

1110 Forming the uncooled suspension into a desired shape, including producing pellets via a pelletizing process;

1111 Allowing the shaped suspension to cool; and then

1112 Removing the resulting composite material for immediate use, storage, transport, or further processing;

1113 Said further processing comprising melting the optionally-collected polystyrene;

1114 Said further processing comprising melting the optionally-collected polystyrene and applying it as a coating to the outer surfaces of the resulting composite material FIG. 12 is flowchart diagram showing the steps of a process 1200 for producing multilayered construction elements in one embodiment of the present invention, said steps comprising:

1201 Stack bottom decorative layer;

1202 Cover with processed waste plastic aggregate;

1203 Level by mechanical means or by partial melting;

1204 Stack strengthening plastic filler elements;

1205 Cover with processed waste plastic aggregate;

1206 Level by mechanical means or by partial melting;

1207 Stack second strengthening plastic filler element layer;

1208 Cover with processed waste plastic aggregate;

1209 Level by mechanical means or by partial melting;

1210 Stack top decorative layer; and

1211 Final partial melt to adhere all layers.

A further embodiment of the invention is referred to as a Plastic Optimized Shapes Board (P-OSB) which is comprised of polygonal shapes of P-CORE™, composition.

Figure 13:
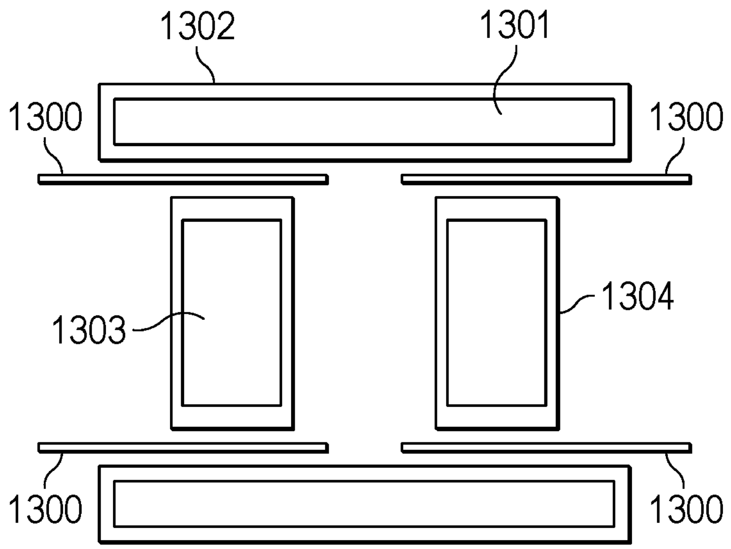
FIG. 13 is a side planform view showing multiple structural components being bonded to each other via interposed heating elements in one embodiment of the present invention.

Refer to FIG. 13, in which heating elements 1300 are interposed between structural units to be bonded together; 1301 are any PCORE composite material, other plastic, metal, or wood structure having a polystyrene coating 1302; and 1303 are any PCORE composite material, other plastic, metal, or wood beams or panels having a polystyrene coating 1304. The layers of polystyrene coating are thicker on the surfaces contacting the interposed heating elements.

In order to bond two or more structural components 1301, 1303 having polystyrene coatings 1302, 1304 applied, said structural components being made of PCORE composite material or any other building material such as metal, wood, or plastic:

1. Position components to be bonded 1301, 1303 in a mold or fixture such that they are held rigidly in place throughout the bonding process;
2. Interpose bonding means:

If using chemical means, apply chemical bonding agent to the surfaces being bonded;

If using heating mean, insert heating elements 1300 between surfaces to be bonded;

3. Allow bonding means to partially melt or breakdown the polystyrene coatings 1302, 1304;
4. If using heating elements, remove them; press surfaces to be bonded firmly together until polystyrene layers have cooled and combined;
5. Carefully test strength of bonded components before removing from mold.

Figure 14:
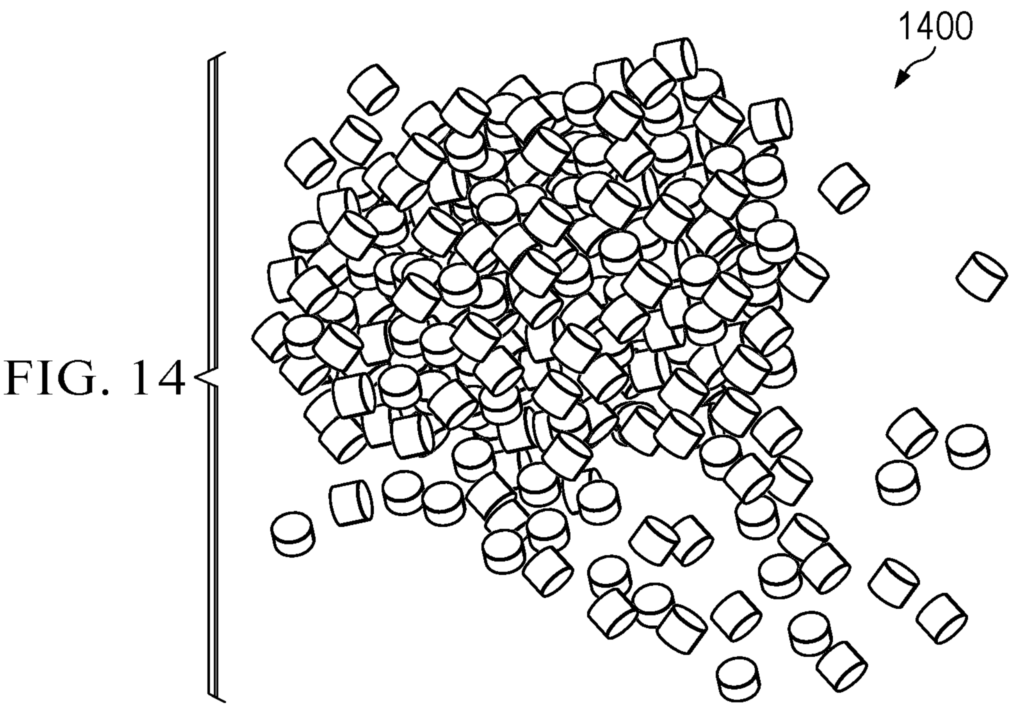
FIG. 14 is an example of the composite material of the invention in pellet form.

FIG. 14 shows the composite material resulting from the method of the invention in the form of pellets 1400.

In an embodiment of the present invention, multiple layers of alternating PCORE composite material and any polystyrene are shown stacked and bonded to each other. In another embodiment of the present invention, the structural components being stacked between polystyrene layers are comprised of common construction materials such as metal, wood, etc.

In an embodiment of the present invention, plastics falling under the RIC 6, namely Expanded Polystyrene (EPS) and Extruded Polystyrene (XPS), are separated from the incoming assorted plastic stream and utilized as additional structural reinforcement in the following ways:

EPS/XPS is collected, melted, and extruded onto an existing structural component as a reinforcing layer;

EPS/XPS is collected, melted and extruded into an existing structural component as a reinforcing layer;

EPS and/or XPS is separated, collected, melted, refined, and distributed over a structural component comprised of PCORE composite material when said composite material is in a workable temperature range;

EPS and/or XPS is separated, collected, melted, refined, and distributed over a structural component comprised of PCORE composite material and then rolled or pressed flat via mechanical means.

In another embodiment of the present invention, non-recyclable plastics are separated, collected, then rendered, or reduced in size by mechanical means such as continuous chopping or cutting by a blade or sharpened edge, after which they are layered within a workable PCORE composite material component (workable meaning the PCORE component is held in a temperature range within which the low-melting point binding plastics have partially or completely melted), the additional rendered plastic serving to improve the structural and mechanical properties of the original PCORE component, including bending strength.

In an embodiment of the present invention, an existing structural component comprised of PCORE composite material or other common construction material such as wood or steel is treated via coating with a material comprising the separated, prepared (by partial or complete melting) polystyrene, including expanded polystyrene (EPS) and extruded polystyrene (XPS). Note that in the case wherein two structural components comprised of PCORE composite material are being bonded by chemical, heat, or pressure bonding means, the polystyrene coating does not interfere with said bonding process.

An additional property of the polystyrene coating process is that applying a coating of EPS and/or XPS at or slightly above the melting temperature allows the polymer molecular chains to retain their molecular bonds.

In a further embodiment of the present invention, mechanically rendered and temperature-controlled EPS can be distributed on to a heated structural component and rolled flat; said flat rolled EPS can then be used as smooth polystyrene film to apply and hold adhesives such as labels.

In addition, said polystyrene film can be further processed to add texture and to facilitate the adherence of paint, epoxy, or other coatings.

Applying multiple layers of polystyrene to structural components comprised of PCORE composite material improves bending strength of said structural component and confers UV protection.

The invention is a system and recycling process, and resulting product, for converting waste plastic into a versatile composite material, said recycling process comprising the steps of: acquiring a sufficient amount of unsorted, unseparated waste plastic; processing said waste plastic into an aggregate via mechanical shredding; thoroughly mixing said plastic aggregate; sanitizing said plastic aggregate to remove unwanted residue; taking a sample of said plastic aggregate and partially melting and molding said aggregate at low temperature; inspecting said sample to determine the ratio of solid plastic aggregate to melted plastic binding agent; adjusting the ratio of high-melting-point plastics to low-melting-point plastics in the bulk plastic aggregate so that there is more low melting plastic, wherein low melting plastic is defined as having a melting point of less than 180 degrees Celsius with 1:1 low melting to high melting plastic (greater than 180 degrees Celsius) being the lowest limiting ratio wherein the range of low to high melting plastic is preferably 3:1 to 30:1 and more preferably 7:1 to 9:1; melting the bulk plastic aggregate at a low temperature until it is a suspension of solid high-melting-point plastic aggregate in a fluid low-melting-point plastic mixture; forming the uncooled suspension into a desired shape; allowing the shaped suspension to cool; and removing the resulting composite material for further processing and storage or transport.

The invention further comprises the step of applying a decorative or protective coating to one or more sides of the resulting composite material. The invention resulting from the above steps is a versatile composite material suitable for use in the construction and fabrication of various structures and items, said composite material comprising a heterogenous suspension of plastic filler elements having a high-melting-point in a binding element of substrate plastics having a low melting point. The plastic filler elements are similar in shape and dimension to each other. The composite material further comprises the plastic filler elements being a random aggregate of rendered plastic of varying dimensions, rendered plastic comprising waste plastic processed by mechanical means into shreds, flakes, chips, threads, bits, powder, slivers, shavings, parings, flecks, scales or fragments. The composite material further comprises the plastic filler elements being oriented in one or more specific common directions with respect to each other, the orientation of each filler element being determined by the orientation of its principal axis. The composite material further comprises the plastic filler elements being oriented in unspecified random directions relative to each other and the overall shape of the composite material.

An embodiment of the invention is further a construction element comprising one or more layers of composite material, said composite material comprising a heterogenous suspension of plastic filler elements having a high-melting-point in a binding element of substrate plastics having a low melting point. The construction element further comprises the plastic filler elements being similar in shape and dimension to each other. The construction element further comprises the plastic filler elements being oriented in one or more specific common directions with respect to each other, the orientation of each filler element being determined by the orientation of its principal axis. The construction element further comprises the plastic filler elements being oriented in unspecified random directions relative to each other and the overall shape of the associated construction element. The construction element further comprises the plastic filler elements being a random aggregate of rendered plastic of varying dimensions, rendered plastic comprising waste plastic processed by mechanical means into shreds, flakes, chips, threads, bits, powder, slivers, shavings, parings, flecks, scales or fragments. The construction element further comprises the plastic filler elements being oriented in unspecified random directions relative to each other and the overall shape of the associated construction element. The construction element further comprises the constituent layers being similar in composition to each other. The construction element further comprises the constituent layers having differing compositions, said layers being arranged as follows: a decorative bottom layer, a lower layer of rendered plastic filler elements suspended in a binding element of substrate plastics, a lower layer of shaped strengthening plastic filler elements, a middle layer of rendered plastic filler elements suspended in a binding element of substrate plastics, an upper layer of shaped strengthening plastic filler elements, an upper layer of rendered plastic filler elements suspended in a binding element of substrate plastics, and a decorative top layer. The shaped strengthening plastic filler elements further comprises a processed waste plastic dimensioned as flat polygonal shapes such as circles, triangles, or quadrilaterals having dimensions larger than the dimensions of the rendered plastic filler elements of the second, middle, and sixth layers. In an embodiment, the shaped strengthening plastic filler elements comprise processed waste plastic dimensioned as long thin strands or strips. In an additional embodiment, the constituent layers have differing compositions, said layers being arranged as follows: a bottom layer of shaped strengthening plastic filler elements, a middle layer of rendered plastic filler elements suspended in a binding element of substrate plastics, and a decorative top layer. In an additional embodiment, the construction element has shaped strengthening plastic filler elements comprise processed waste plastic dimensioned as flat polygonal shapes such as circles, triangles, or quadrilaterals having dimensions larger than the dimensions of the rendered plastic filler elements of the second, middle, and sixth layers. In an additional embodiment, the construction element has shaped strengthening plastic filler elements wherein the strengthening layers are comprised of thin, flat, recyclable material polygonal, shapes with hole perforations that enhance adhesive penetration and shape retention to improve the overall tensile strength. In an additional embodiment, the construction element further comprises being dimensioned as a flat panel. In an additional embodiment, the construction element further comprises being dimensioned as a corrugated sheet.

The invention further comprises a structure comprised of construction elements, said construction elements comprising one or more layers of composite material, said composite material comprising a heterogenous suspension of plastic filler elements having a high-melting-point in a binding element of substrate plastics having a low melting point. In an additional embodiment the structure further comprises the plastic filler elements being similar in shape and dimension to each other. In an additional embodiment the structure further comprises the plastic filler elements being oriented in one or more specific common directions with respect to each other, the orientation of each filler element being determined by the orientation of its principal axis. In an additional embodiment, the structure further comprises the plastic filler elements being oriented in unspecified random directions relative to each other and the overall shape of the associated construction element. In an additional embodiment, the structure further comprises the plastic filler elements being a random aggregate of rendered plastic of varying dimensions, rendered plastic comprising waste plastic processed by mechanical means into shreds, flakes, chips, threads, bits, powder, slivers, shavings, parings, flecks, scales or fragments. In an additional embodiment, the structure is a circular shelter having a roof dimensioned as a cone, said construction elements comprising wall panels and overlapping, interlocking roof panels, as well as flooring panels and hollow bricks made of said composite material to be filled with a weighting material such as sand or gravel. In an additional embodiment, the structure of is a shelter dimensioned as a rectangular prism having a sloped canvas roof and canvas walls, said construction elements comprising poles for framing and bracing and hollow bricks made of said composite material to be filled with a weighting material such as sand or gravel. In an additional embodiment, the structure is further comprised of strategically located layers of non-recyclable plastic-oriented strands or randomly oriented small polygonal shapes so as to significantly improve its tensile strength.

The invention is a system and recycling process for converting waste plastic into a versatile composite material, said recycling process comprising the steps of acquiring a sufficient amount of unsorted, unseparated waste plastic; optionally separating polystyrene, including expanded polystyrene (EPS) and extruded polystyrene (XPS) from the bulk; processing said waste plastic into an aggregate via mechanical shredding; thoroughly mixing said plastic aggregate; sanitizing said plastic aggregate to remove unwanted residue; taking a sample of said plastic aggregate and partially melting and molding said aggregate at low temperature; inspecting said sample to determine the ratio of solid plastic aggregate to melted plastic binding agent; adjusting the ratio of high-melting-point plastics to low-melting-point plastics in the bulk plastic aggregate until it is approximately 1:1; melting the bulk plastic aggregate at a low temperature until it is a suspension of solid high-melting-point plastic aggregate in a fluid low-melting-point plastic mixture; forming the uncooled suspension into a desired shape; and allowing the shaped suspension to cool.

In an embodiment, the desired shape are pellets produced via a pelletizing process. The invention further comprises the step of using, storing or transporting the composite material. The invention further comprises the step of melting the optionally-collected polystyrene. In a further embodiment, the invention comprises the step of applying a coating to the outer surfaces of the composite material, said coating comprising the melted optionally-separated polystyrene.

The invention further comprises a composite material, said composite material comprising a heterogenous suspension of plastic filler elements having a high-melting-point in a binding element of substrate plastics having a low melting point, said plastic filler elements having separated therefrom, polystyrene, including expanded polystyrene (EPS) and extruded polystyrene (XPS). The composite material can be shaped in the form of pellets. The plastic filler elements used in the invention can be pre-processed to be of a similar shape and dimension.

The invention comprises said composite material wherein the plastic filler elements are a random aggregate of rendered plastic of varying dimensions, rendered plastic comprising waste plastic processed by mechanical means into shreds, flakes, chips, threads, bits, powder, slivers, shavings, parings, flecks, scales or fragments.

The invention further comprises a construction element comprising one or more constituent layers of composite material, said composite material comprising a heterogenous suspension of plastic filler elements having a high-melting-point in a binding element of substrate plastics having a low melting point, said plastic filler elements having separated therefrom, polystyrene, including expanded polystyrene (EPS) and extruded polystyrene (XPS). In the invention, the plastic filler elements are similar in shape and dimension to each other. Alternatively, the plastic filler elements are oriented in one or more specific common directions with respect to each other, the orientation of each filler element being determined by the orientation of its principal axis. Further alternatively, the plastic filler elements are oriented in unspecified random directions relative to each other and the overall shape of the associated construction element. Further alternatively, the plastic filler elements are a random aggregate of rendered plastic of varying dimensions, rendered plastic comprising waste plastic processed by mechanical means into shreds, flakes, chips, threads, bits, powder, slivers, shavings, parings, flecks, scales or fragments. Further alternatively, the plastic filler elements are oriented in unspecified random directions relative to each other and the overall shape of the associated construction element. In a further embodiment, the constituent layers are similar in composition to each other. Alternatively, the constituent layers have differing compositions, said layers being arranged as follows: a decorative bottom layer, a lower layer of rendered plastic filler elements suspended in a binding element of substrate plastics, a lower layer of shaped strengthening plastic filler elements, a middle layer of rendered plastic filler elements suspended in a binding element of substrate plastics, an upper layer of shaped strengthening plastic filler elements, an upper layer of rendered plastic filler elements suspended in a binding element of substrate plastics, and a decorative top layer. In a further embodiment, the construction element has shaped strengthening plastic filler elements comprising processed waste plastic dimensioned as flat polygonal shapes such as circles, triangles, or quadrilaterals having dimensions larger than the dimensions of the rendered plastic filler elements of the second, middle, and sixth layers. Said shaped strengthening plastic filler elements can comprise processed waste plastic dimensioned as long thin strands or strips. and assorted polygons including triangles, squares and circles with irregular aperture sizes and quantities.

In a further embodiment, the construction element further comprises the constituent layers having differing compositions, said layers being arranged as follows: a bottom layer of shaped strengthening plastic filler elements, a middle layer of rendered plastic filler elements suspended in a binding element of substrate plastics, and a decorative top layer. The construction element can be fabricated using a ratio of plastics having both low and high melting points, wherein the melting point is 180 degrees Celsius with a ratio of no less than 1:1 low to high melting point plastics, provided that the bulk plastics can have a ratio of less 1:1 if there are no physical or strength detrimental effects to the low melting plastics.

The embodiments shown and described above are only exemplary. Even though numerous characteristics and advantages of the present invention have been set forth in the foregoing description, the disclosure is illustrative only and changes may be made within the principles of the invention to the full extent indicated by the broad general meaning of the terms used herein. Various alterations, modifications and substitutions can be made to the disclosed invention and the system that implements the present invention without departing in any way from the spirit and scope of the invention.

I claim:

1. A construction element comprising one or more constituent layers of composite material, said composite material comprising a heterogenous suspension of plastic filler elements having a high-melting-point in a binding element of substrate plastics having a low melting point, said plastic filler elements having separated therefrom, polystyrene, including expanded polystyrene (EPS) and extruded polystyrene (XPS), further comprising the plastic filler elements being oriented in one or more specific common directions with respect to each other, the orientation of each filler element being determined by the orientation of its principal axis.

2. A construction element comprising one or more constituent layers of composite material, said composite material comprising a heterogenous suspension of plastic filler elements having a high-melting-point in a binding element of substrate plastics having a low melting point, said plastic filler elements having separated therefrom, polystyrene, including expanded polystyrene (EPS) and extruded polystyrene (XPS), further comprising the plastic filler elements being oriented in unspecified random directions relative to each other and the overall shape of the associated construction element.

3. A construction element comprising one or more constituent layers of composite material. said composite material comprising a heterogenous suspension of plastic filler elements having a high-melting-point in a binding element of substrate plastics having a low melting point, said plastic filler elements having separated therefrom, polystyrene, including expanded polystyrene (EPS) and extruded polystyrene (XPS), further comprising the plastic filler elements being a random aggregate of rendered plastic of varying dimensions, rendered plastic comprising waste plastic processed by mechanical means into shreds, flakes, chips, threads, bits, powder, slivers, shavings, parings, flecks, scales, and fragments.

* * * * *